United States Patent

Christ

[15] 3,697,941
[45] Oct. 10, 1972

[54] VEHICLE LOCATION SYSTEM AND METHOD

[72] Inventor: David L. Christ, Bethesda, Md.
[73] Assignee: Devenco Incorporated
[22] Filed: July 1, 1971
[21] Appl. No.: 158,748

[52] U.S. Cl.................340/23, 250/199, 343/100 CS
[51] Int. Cl. ............................................G08g 1/12
[58] Field of Search......340/22, 23, 24, 31 R, 32, 33; 250/199; 343/6.8 R, 100 CS, 112 PT, 112 TC; 325/16

[56] References Cited

UNITED STATES PATENTS

| | | | |
|---|---|---|---|
| 3,644,883 | 2/1972 | Borman et al. ...............340/23 |
| 3,633,158 | 1/1972 | Heibel........................250/199 |
| 3,568,161 | 3/1971 | Knickel........................340/24 |
| 3,377,616 | 4/1968 | Auer, Jr.......................340/23 |

OTHER PUBLICATIONS

E. Ray Knickel, A. W. Vanhorn; " Call Box Sensor Car Location System" ; IEEE Transactions on Vehicular Technology, Vol. VT-19 No. 2 May 1970 pages 178- 184

*Primary Examiner*—Kathleen H. Claffy
*Assistant Examiner*—Randall P. Myers
*Attorney*—Breitenfeld & Levine

[57] ABSTRACT

Traffic lights in a prescribed area are modulated so that the energy, e.g., visible light, emitted by each light carries a predetermined code different from the modulating code of every other traffic light. Vehicles moving about the prescribed area carry means for sensing the modulated energy emitted by each traffic light, and for transmitting to a remote location a signal incorporating the modulation code. At the remote location, the signal is received and converted into a visual display indicating the location corresponding to the received code.

22 Claims, 9 Drawing Figures

INVENTOR:
DAVID L. CHRIST

BY Breitenfeld & Levine

ATTORNEYS

VEHICLE LOCATION SYSTEM AND METHOD

This invention relates to providing information at a central station about the location of vehicles moving about a prescribed area. In this context, the vehicles may be police cars, buses, trucks, taxis, airplanes on the ground at an airport, or any vehicles whose movements it is desired to monitor.

Vehicle location systems of this type are known. In one such system, special radio receiving installations are established at various locations in the prescribed area, and each vehicle carries a radio transmitter, the signal from which is picked up by the receivers. The received signals are transmitted to a central station, and by triangulation or other known methods the location of a vehicle transmitting a signal is determined.

A primary objection to this known system, and others, is that special receiving stations, or other special installations, must be constructed, which obviously involves great expense.

It is, therefore, an object of the present invention to provide a reliable and practical vehicle location system wherein existing, although slightly modified, installations in the prescribed area re used in tracking the movements of a vehicle within that area. Since the installations are already present, the cost of installing the present system is far less than comparable conventional systems of the type mentioned above.

It is a more specific object of the invention to employ traffic lights as the beacons for emitting information defining their respective locations, but it is contemplated that other types of stationary pre-existing light sources may prove useful in certain situations.

It is another object of the invention to provide a system that can locate a vehicle with an accuracy on the order of the length of a city block. This accuracy is often not possible with systems using triangulation of radio waves since multipath problems lead to erroneous measurements.

It is a further object of the invention to provide such a system involving modulating a traffic light, so that it emits a unique code, wherein the equipment for producing the modulation can easily be installed and maintained by personnel who normally service the traffic light.

It is an additional object of the invention to provide in each vehicle means for sensing and transmitting to the central station the coded information it receives from each traffic light, and in which a radio usually provided in the vehicle may be used to transmit the coded information without disturbing normal voice communication, and without requiring the use of special frequency bands other than the bands already allocated to such vehicles, although of course additional channels may be used if required.

It is another object of the invention to provide a system wherein location information is transmitted automatically at predetermined intervals to the central station, or alternatively is transmitted only upon receipt of a polling signal from the central station.

Additional objects, features, and advantages of the invention will be apparent from the following description in which reference is made to the accompanying drawings.

Figure 1:
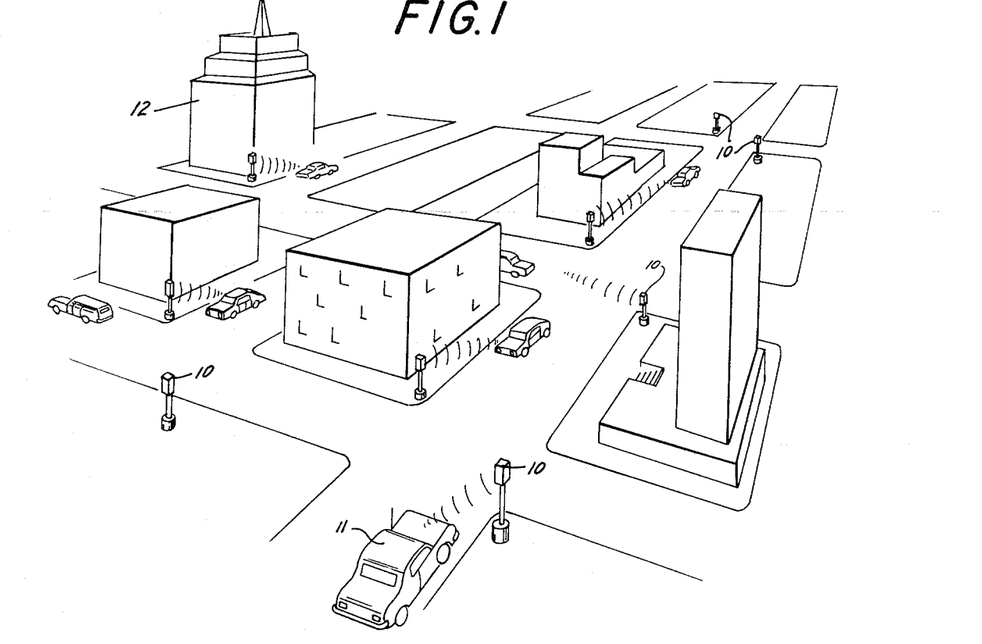
FIG. 1 is a perspective view showing part of a prescribed area in which vehicles are to be monitored.

FIG. 1 illustrates a number of square blocks of a city having the usual traffic lights 10 on various corners to control traffic at the street intersections. Vehicles, such as a police car 11, move about the area, and information about the location of these vehicles is to be continuously available at a central station 12, which may be police headquarters. While a highly urban area is illustrated in FIG. 1, the invention is just as useful in suburban or rural areas, the only difference being that fewer traffic lights per unit area are present in a less urban area. In such a case, other types of existing lighting may be modulated to supplement the traffic lights which are employed, and if necessary new light installations may be provided at strategic points having no pre-existing light sources.

Figures 2, 3:
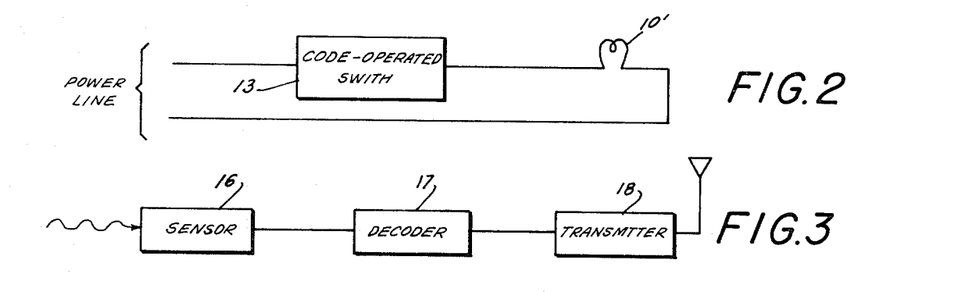
FIG. 2 is a block diagram illustrating means for modulating one of the traffic lights.
FIG. 3 is a block diagram illustrating means carried by vehicle for receiving and transmitting the modulation codes emitted by the traffic lights.

FIG. 2 illustrates a traffic light modified according to the present invention. The light sources of a traffic light are usually incandescent lamps 10' (only one being illustrated) containing filaments. Suitable means, such as a code-operated switch 13, modulates the power supply to lamps 10' thereby modulating the energy, including the visible light energy, emitted by the lamps. The modulation applies a predetermined code to the lamps of each traffic light, the code being different for each traffic light, although traffic lights located at the same intersection should emit the same code. The modulating code of each traffic light is used to identify its location. The lamps 10', of each traffic light, which face in different directions may also be modulated to add coded information indicating the direction in which they face, so that the code sensed and transmitted by a vehicle will supply both the location of the vehicle and its direction of travel. Any suitable type of modulation of the traffic light power supply may be employed, such as amplitude modulation, frequency modulation, or phase modulation.

As indicated in FIG. 3, each vehicle 11 carries a sensor 16 for sensing the modulated visible light emitted by a traffic light 10. While it is preferred that visible light serve as the carrier for the code, it is appreciated that incandescent lamps emit infra-red and ultra-violet radiation as well as visible light, and under some circumstances it may be advantageous to employ either of these spectrums as the code carrier. In such a case, sensor 16 will of course be sensitive to infra-red or ultra-violet energy, instead of visible light energy. Sensor 16 converts the code-carrying light energy into an electrical signal which is applied to a decoder 17, the latter serving to extract the coded information. This information is applied to a transmitter 18, which may the radio transmitter usually carried by police cars and other vehicles.

Figure 4:
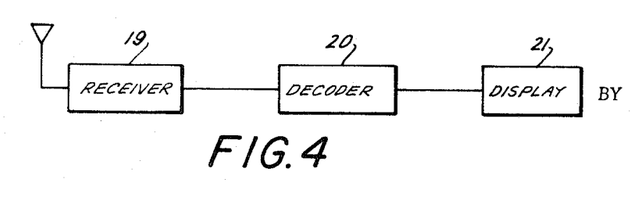
FIG. 4 is a block diagram illustrating the installation at a central station.

Transmitter 18 sends a signal incorporating the code to a receiver 19 (FIG. 4) at the central station 12. Decoder 20 extracts the code from the transitted signal and applies it to a display means 21 which indicates to a viewer the location of the vehicle.

Figure 5:
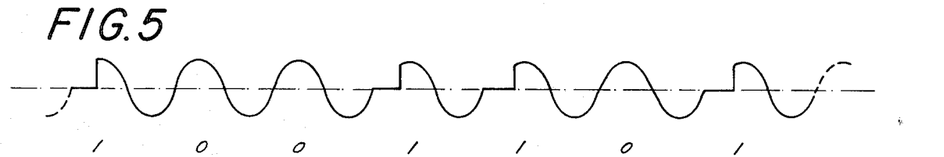
FIG. 5 illustrates a possible modulated waveform of the current supplying the lamps of the traffic light.

One way of modulating a lamp 10' is to vary its intensity in accordance with a predetermined code. For example, if a binary code is employed involving a series of "ones" and "zeros," a portion of a positive half-cycle of the A.C. power supplying the traffic light can be shut off, thereby reducing lamp intensity, to indicate a "one," whereas a complete positive half-cycle will indicate a "zero." Thus, if a code portion were 1001101, the current supplying the lamp might appear as shown in FIG. 5. Although in this illustration only positive half-cycles are employed to transmit the code, negative half-cycles could just as well be used, or all succeeding half-cycles could be used instead of just half-cycles of like polarity.

Interruption of the positive half-cycles of the power supply according to a predetermined code can be achieved by connecting a code-generator to well-known circuitry for controlling lamp brightness utilizying a silicon-controlled rectifier (SCR). An example of such circuitry is shown in FIG. 9.8 of the General Electric SCR Manual (Fourth Edition, 1967) and is illustrated at 24 in FIG. 6.

The R-C circuit, comprising resistor 25 and capacitor 26, serves to delay the firing of the SCR 27 via its trigger circuit 28, during positive half-cycles, by an amount of time necessary to create the flat portions of the current waveform, shown in FIG. 5, representing code "ones." The reverse-connected diode 28 permits negative current to flow through lamp 10' for virtually the entire negative half-cycle of the current waveform, as indicated in FIG. 5. If no pulse is provided to trigger circuit 28 by pulse generator 29, the firing of SCR 27 is delayed and current during a positive half-cycle is shut off momentarily. Therefore, lamp intensity decreases and a code "one" has been generated. Diode 28 allows normal current flow during negative half-cycles. Since the current is off only momentarily during any cycle, the lamp brilliance is near normal.

Figure 6:
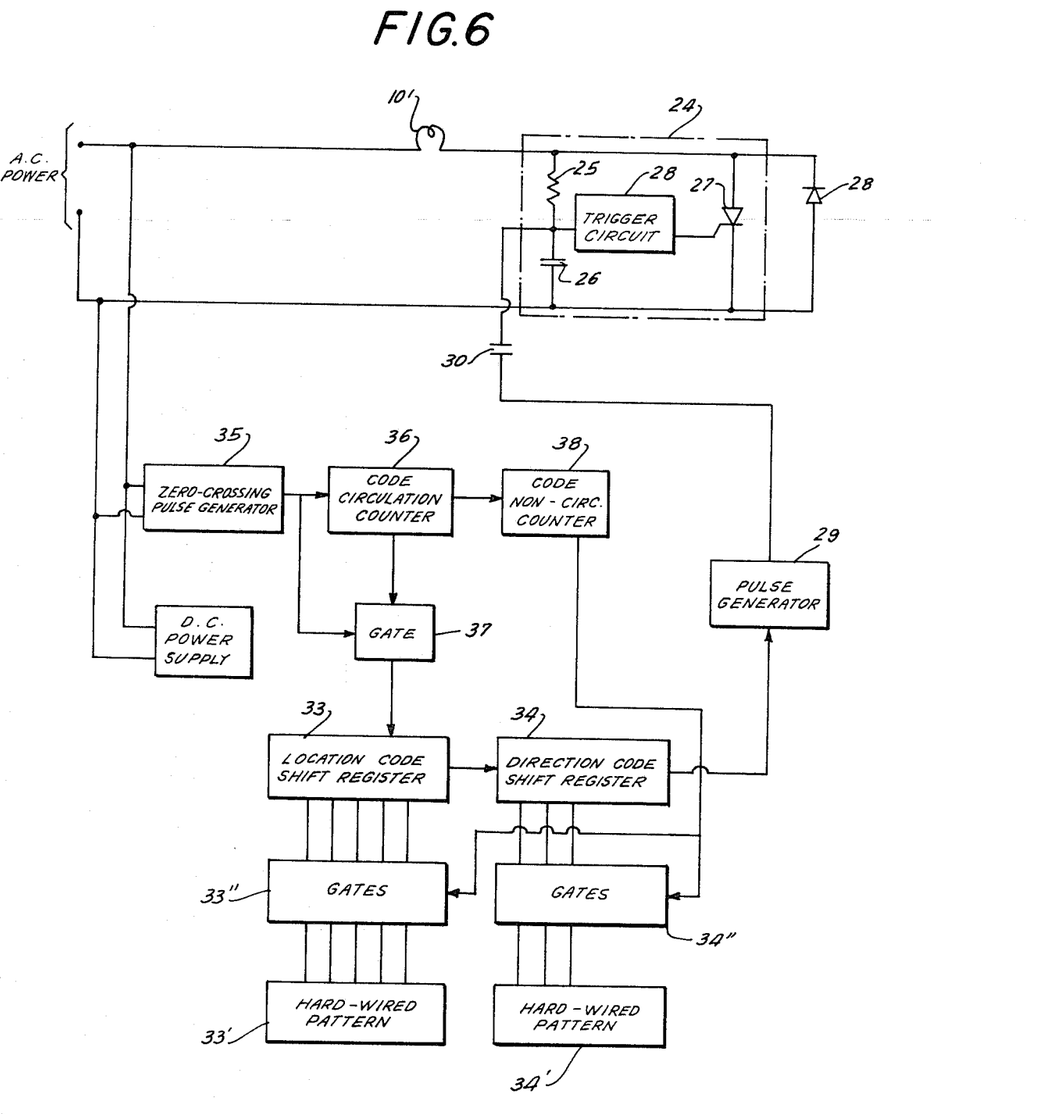
FIG. 6 is a combined block and schematic diagram of a modulating arrangement for the traffic lights.

Should a pulse be produced by pulse generator 29, it is coupled to trigger circuit 28 by a capacitor 30. Such a pulse causes immediate firing of SCR 27, rather than after the delay imposed by the R-C circuit 25, 26. Hence, a complete positive half-cycle of current reaches lamp 10' and a code "zero" has been generated. Imposing the code pattern only during the positive half-cycles, or only during the negative half-cycles, insures that the basic or "carrier" frequency of the code is 60 times per second (assuming 60 cycles A.C. power is applied), and not at 120 times per second which is the normal "flicker" rate of most lamps that brighten equally for positive and negative current flow. Consequently, the code carrier frequency will not be interferred with by the power line frequency.

The production of pulses by pulse generator 29 may be controlled by a memory, illustrated in FIG. 6 as two shift registers 33 and 34. The code identifying the location of the traffic light is continuously circulated through shift register 33 and the code identifying the direction in which the particular lamp 10' is facing is continuosuly circulated through a usually smaller, shift register 34. In the event of a power failure, the codes in the shift registers will usually be erased or corrupted. Therefore, the location code is also carried by a "hard-wired" pattern 33' and the direction code is carried by a "hard-wired" pattern 34', the hard wired patterns being connected to their respective shift registers by suitable gates 33'' and 34''. When power resumes, after a failure, the proper codes are reconstituted in the shift registers by reference to the hard-wired patterns.

The appearance of code bits, i.e., "zeros" and "ones," at lamp 10' is timed to be synchronous with the A.C. power frequency by using the power waveform as a clock for circulating the code bits through shift registers 33 and 34. To accomplish this a pulse is created by a pulse generator 35, of well-known type, each time a positive going portion of the waveform passes through zero, these pulses being applied to shift register 33. It may be desired to provide periods during which the code is not circulated alternating with periods during which it is circulated, i.e., periods during which lamp 10' is not modulated alternating with periods during which it is modulated. This enables circuitry in the vehicle to sense the beginning of a code sequence without resort to special "code start" patterns that must be sought by the vehicle decoder. In such a case, a counter 36 is furnished which is operated in synchronism with the A.C. power by pulses from pulse generator 35, and causes a gate 37 to open, and pass pulses from pulse generator 35 to shift register 33, for an accurately controlled duration. When gate 37 closes, the shift registers cease to circulate the code bits. A similar combination of a counter 38 and gates 33'' and 34'' controls communication between the shift registers and their respective hard-wired patterns.

As the codes are circulated through the shift registers 33 and 34, each "zero" bit causes pulse generator 29 to produce a pulse, whereas no such pulse is produced for a "one" bit. If it is not desired to provide information concerning the direction of travel of the vehicle, shift register 34 and its associated hard-wired pattern 34' and gates 34'' may be eliminated.

The entire arrangement illustrated in FIG. 6, including the switch arrangement 24, can be packaged as a small inexpensive unit for mounting within the existing traffic light control cabinet. It is installed by simply removing the lamp-circuit wires from the timer and relay circuits and interposing the modulator unit between the usual connections; no modifications of the existing control circuits or the basis of their operations would be required. The applied modulation is not noticeable to the human eye, nor are normal light levels affected to any noticeable extent.

In the scheme described above, lamp 10' is modulated by decreasing its intensity. However, modulation could also be accomplished in other ways, such as by increasing the lamp intensity during certain half-cycles of the power supply. Alternatively, modulation could be accomplished by adding a frequency to a positive half-cycle of the power supply, to indicate a "one" bit, while leaving the power supply unchanged to indicate a "zero" bit. Or, a signal having one frequency could be added to positive half-cycles of the power supply to indicate a "one" bit, and a signal having a different frequency could be added to other positive half-cycles to indicate a "zero" bit. This approach is basically an FSK modulation technique. In either case, the added frequencies should be much higher than the frequency of the power supply so that they appear as a burst of rapid alternations.

Another alternative modulation technique involves rectifying the A.C. power input to lamp 10' to convert it to a D.C. power input having an amplitude which maintains the same lamp brightness as the A.C. power. The method of modulation can be similar to any of those mentioned above, i.e., an FSK type modulation or a straight pulse amplitude modulation either at the line frequency rate or at a different higher or lower rate. The advantage of first converting to D.C. is that the the coded data frequencies do not conflict with or become contaminated with the power line frequency. Thus, ideally the light intensity does not have the 120 Hz frequency components and harmonics that are present in lamps driven directly from the A.C. line, and the code need not be concerned with these frequencies.

Figure 7:
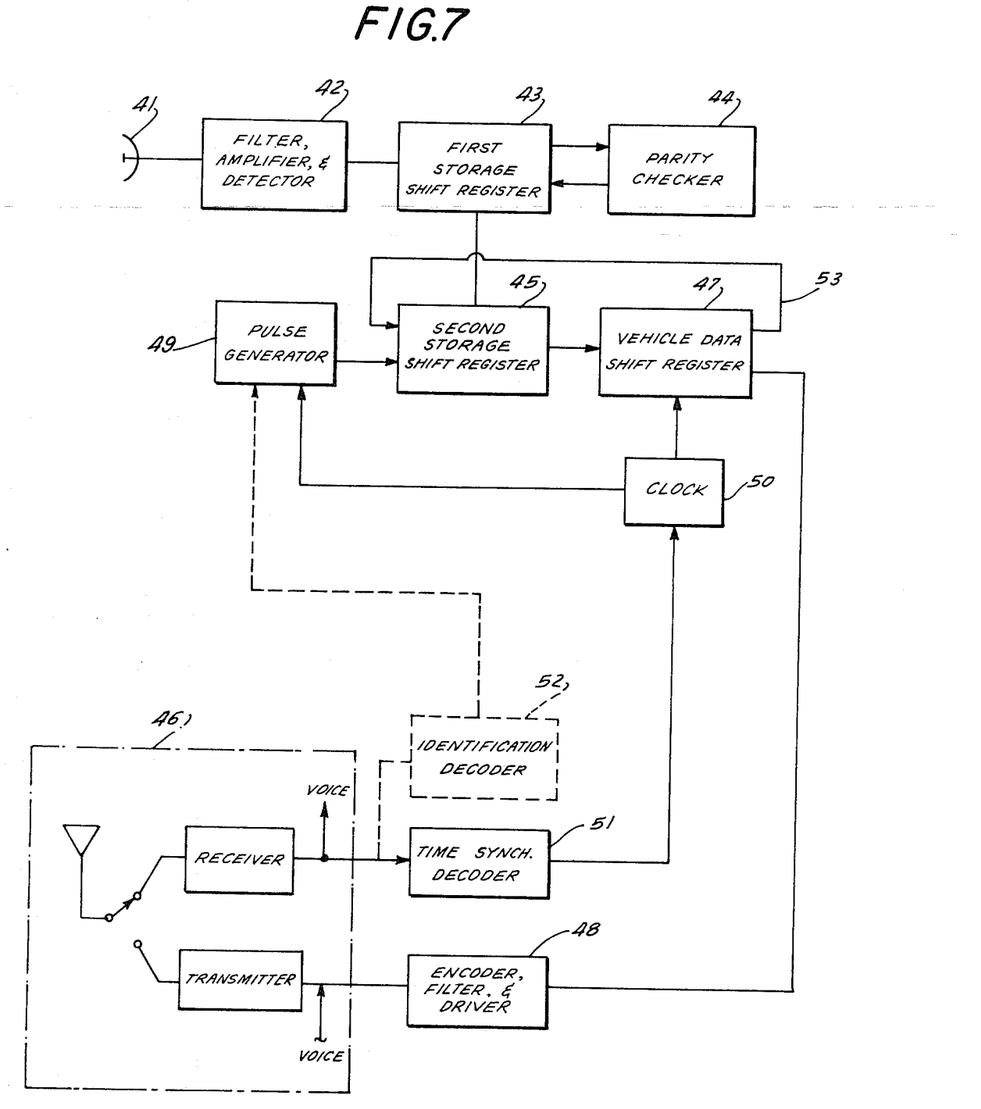
FIG. 7 is a block diagram of a sensing and decoding arrangement carried by each vehicle.

FIG. 7 illustrates an arrangement which may be employed with each of the vehicles being monitored, all of the components shown being carried by the vehicle. A sensing device 41, which may be a photoelectric cell within a reflector, is placed in an appropriate location for sensing the modulated light from the traffic lights. Preferably, the sensor is mounted on top of the dashboard so that it can receive the modulated light through the vehicle windshield. In this way, the sensor will not be blocked by snow, dirt, or heavy rain. Suitable masks may be used to limit light pick-up from a field of view in which the light emitted by traffic lights will appear. Also, since it will often be sufficient to modulate only the green lights of the traffic signals, a green filter may be placed over the photocell. Should it be desirable to modulate both the red and green lights, separate red and green filtered sensors may be used.

The coded information picked-up by sensor 41 is recognized by a suitable filter or filters and is amplified and detected at 42. The code thus converted from optical energy to electrical energy is passed in bit-serial fashion to a first storage shift register 43. When this register is filled, or while it is being filled, the code parity is checked, by any well known type of parity checker 44, to determine the validity of the data received, i.e., to verify that the data received is an actual code.

If the code entered into the first storage register 43 is valid, it is transferred to a second storage shift register 45 from which it can be transmitted to the central station via a radio 46 in the vehicle. During these transmission periods, i.e., while the data is circulating through second storage register 45, the latter cannot receive new data from first storage register 43, and hence the first storage register holds the new data until it is ready to be received by second storage register 45. The data could be transmitted directly from first storage register 43, thereby eliminating the need for register 45. However, since register 43 could not receive new data during transmission periods, it is desirable to use two registers as shown so that the data in first storage register 43 is always current.

Additional coded information may be added, by shift register 47, to the coded dated received by sensor 41 before transmission to the central station. This additional information may include an identification of the vehicle transmitting the data, time of day (available from a clock 50), mileage past the last valid code reception point, and other vehicle status data including emergency signals. It is desirable for the data in shift registers 45 and 47 to be continuously circulated and transmitted until new valid data is entered into shift register 43. Therefore, a circuit 53 is furnished to circulate the data from register 47 through register 45.

The data from shift registers 45 and 47 is encoded for radio transmission in serial fashion. One way of accomplishing this is using an encoder 48 which imposes the data on a tone or tones at the high end of the voice spectrum (approximately 3,000 Hz) of the vehicle radio 46, so that these tones share the voice spectrum with the microphone input. In this way, voice and data transmission do not interfere with each other. Furthermore, suitable filters and drivers 48 are provided to prevent voice signals from entering the circulating shift registers.

Circulation of data in second storage register 45 for transmission to the central station is controlled by a pulse generator 49. The pulse generator can be actuated in two ways. First, it can be actuated at regular intervals by clock 50, so that data from this vehicle is transmitted during a predetermined series of "time-slots," the transmission time-slots for each vehicle being different from those of every other vehicle, so that the central station receives data from only one vehicle at a time. To insure no overlap of coded information transmission from the various vehicles, a synchronizing signal may be periodically transmitted by the central station and applied to clock 50 via a decoder 51, thereby periodically synchronizing the clocks 50 of all the vehicles.

Alternatively, a polling technique can be used to control actuation of pulse generator 49. Under this scheme, vehicles do not automatically transmit data at regular intervals, as described above, but instead transmit only in response to a polling signal from the central station. The polling signals are coded so that a different coded polling signal is used for each vehicle. When a polling signal is received, it is decoded by a decoder 52, and if the signal is for this vehicle, it is transferred to pulse generator 49 to initiate circulation and transmission of the data in registers 45 and 47.

The equipment needed at the central station 12 depends upon the complexity of the system and its type of operation, as determined for example by the number of vehicles being monitored and whether data is to be transmitted in response to polling or on a "time-slot" basis controlled by a clock in each vehicle.

Figure 8:
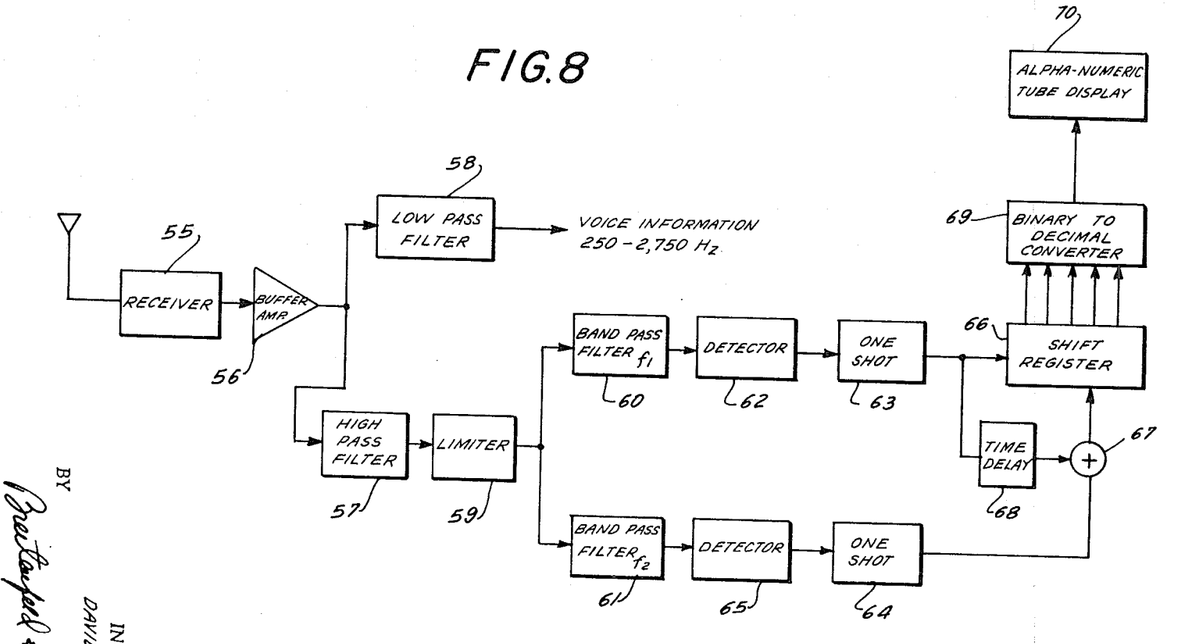
FIG. 8 is a block diagram of a decoding arrangement for use at the central station.

FIG. 8 illustrates one type of central station decoder arrangement. The output of receiver 55 has both voice signals and a frequency shift keyed signal in which the binary coded information is represented by the constant shifting between two frequencies, one of the frequencies representing a "one" and the other representing a "zero." The receiver output passes through a buffer amplifier 56 and the code tones are separated from the voice signal by conventional high pass and low pass filters 57 and 58, respectively. The two tones representing the coded information pass through a limiter 59 and are separated by conventional band pass filters 60 and 61. If a tone is present at filter 60, a signal leaves detector 62 and triggers a one shot circuit 63. Similarly, a tone at filter 61 triggers one shot circuit 64 via detector 65. The output of one shot circuit 63 represents a binary "one" and each such output is entered into a shift register 66. The output of one shot circuit 64 represents a binary "zero," and merely shifts the coded information in the shift register to indicate a zero. Since the coded information in shift register 66 must also be shifted each time a "one" is entered, the output of one shot circuit 63 is applied to an add circuit 67 in the output line of one shot circuit 64 via a time delay circuit 68. Thus, each output pulse from one shot circuit 63 first enters a "one" in shift register 66 and then shifts the information in the register. The shift register may be one of several available on the market, such as the integrated circuit register identified as the "Signitics S8270A."

The data in shift register 66 may be converted to a coded decimal form by a binary to decimal converter 69 and then made visible by application to an alpha-numeric light display 70, such as an assemblage of "MD¹" display units manufactured by Monsanto, or a VTO5 Display Terminal manufactured by Digital Equipment Corporation. After the operator records the displayed information, he may throw a switch to clear the shift register 66 and the display, and thus prepare them for receiving new information. Alternatively, the information from shift register 66 could be used to activate a teleprinter device to provide a printed record of vehicle location and status.

Figure 9:
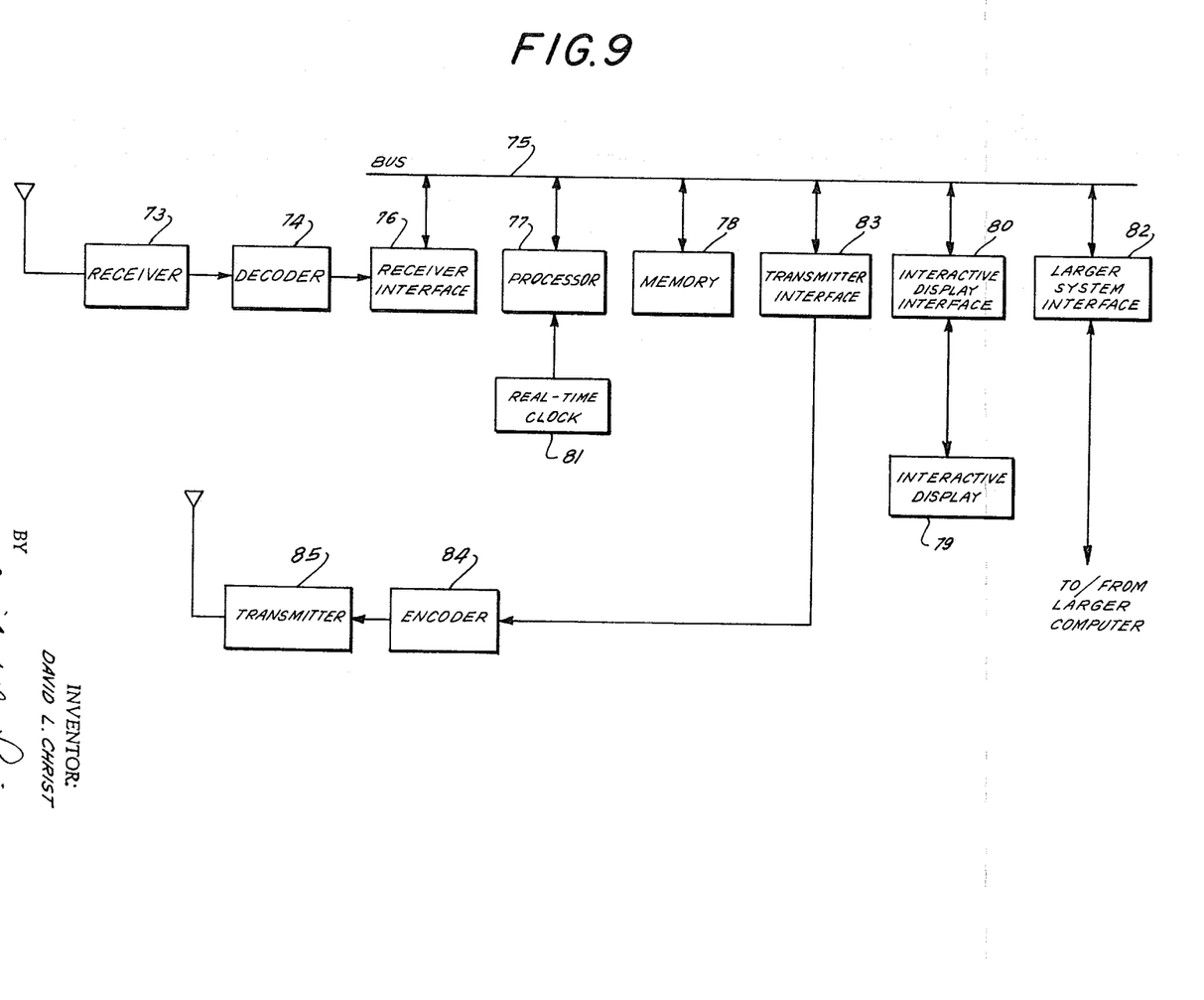
FIG. 9 is a block diagram of another decoding arrangement for use at the central station.

The system just described and illustrated in FIG. 8 is useful when a relatively small number of vehicles are involved and the probability of simultaneous transmission by these vehicles to the central station is small. A more complex central station arrangement is shown in FIG. 9. The output from receiver 73 passes through a decoder 74 and is applied to an input/output bus 75 via a suitable interface 76. Bus 75 forms part of a coded data concentrator which also includes a processor 77 and a memory 78. The processor is conventional, and may be the "PDP-11" sold by Digital Equipment Corporation. The concentrator may also include a real-time clock 81 which controls polling of the vehicles and insures that polling signals are transmitted at properly spaced intervals.

An "interactive" display device 79, having a cathode ray tube and a keyboard, such as the "VTO5" sold by Digital Equipment Corporation is connected to bus 75 via a suitable interface 80.

The concentrator accepts received data inputs and assembles them in convenient groupings. Its prime function is to provide the data in "concentrated" batches at high speed to a larger computer via a suitable interface 82. The larger computer may be one already present at the central station for assisting in command and control functions of a police department, if the vehicles being monitored are police cars. The concentrator thereby relieves the larger computer of the time consuming tasks associated with acceptance of data from individual reporting vehicles arriving at relatively slow rates.

If polling of vehicles is included in the scheme, the concentrator can, due to the presence of real-time clock 81, control the sending of polling signals from bus 75, through a suitable interface 83 and an encoder 84, to a transmitter 85, thus relieving the larger computer of this task. Polling may be done with equipment completely independent of the arrangement shown in FIG. 9, but by using the concentrator to issue polling signals, their rate of issuance can be adjusted to meet problems associated with system loading. Also, polling signals can be initiated by the keyboard of interactive display 79 or the larger computer, should there be momentary or emergency changes in the polling schedule. Furthermore, by use of the configuration shown, polling signals need not interfere with the reception of data from the vehicles, since the larger computer can delay transmission of polling signals while data is being received. Use of a larger computer makes it practical to automatically display vehicle location information on a map of the prescribed area. This can be done by focusing a computer controlled light beam or beams on a display map.

Obviously many types and formats of codes may be used with the present system. One suitable code for most purposes is a 36 bit binary code. 20 bits of the code are for traffic light modulation. Assuming the prescribed area is arranged along X and Y coordinates, a nine bit code is used for lamps facing in the X directions and a nine bit code is used for lamps facing in the Y directions. A 10th parity bit is appended to each nine bit code. In the vehicle, a ten bit code is added to the modulated code data to identify the vehicle. Use of a ten bit identification code makes the system useful with a force of 1,000 vehicles. An 11th parity bit may be added to the vehicle identification code. The remaining five bits may be used for any other additional information. Thus, two bits may be used for steering status (stopped, turning left, turning right, and straight ahead) and two bits may be used for duty status (off duty, routine duty, emergency duty, need assistance).

In the above description, the generation of coded information by traffic light modulation is synchronized with the power line frequency. However, the invention is not restricted to this mode of operation. It may be desirable under some conditions to employ a separate timing control, operating at some predetermined frequency, with which generation of the code bits is synchronized.

Although the system described above is compatible with existing frequency allocations, this is not intended to restrict the operation of the system if system performance is enhanced by going to larger bandwidths or different frequency assignments. Nor is the system restricted to using the existing transeivers that may be in a vehicle or base station. Additional transceivers may be used or special transceivers may be built to optimize vehicular or base band radio terminals, or both. Any method of modulating the transmitter is considered suitable for this system.

The optical system is not restricted to a photocell and parabolic reflector. Any light gathering and light detection device is considered suitable including lenses, photomultiplier tubes, organic fluids, and any other device sensitive to the optical source frequencies. Nor is the system restricted to incandescent lamps as opposed to fluorescent, mercury vapor lamps, neon tubes, and other types of "light" sources that may conceivably be available. Modulation of street lighting equipment as a source of coded information is also considered part of this system as well as specially installed light (or radiation) sources, intended to be used primarily by the system, as supplements to pre-existing light sources.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A vehicle location system for identifying the location of a vehicle moving about a prescribed area in which traffic lights are present, comprising:
   a. means associated with individual traffic lights for modulating energy emitted by said lights, the energy emitted by each light being modulated according to a predetermined code different from the modulating code of every other modulated traffic light, each said code identifying the location of its respective traffic light,
   b. means carried by the vehicle for individually sensing the modulated energy emitted by each traffic light and in response thereto transmitting a signal incorporating a code corresponding to the code carried by the sensed modulated energy, and
   c. means at a location remote from the vehicle for receiving said signal and in response thereto displaying unique location information corresponding to the code incorporated in said received signal.

2. A vehicle location system as defined in claim 1 wherein said means (a) varies the intensity of energy emitted by each modulated traffic light, said intensity variations being in accordance with said predetermined code identifying the location of that traffic light.

3. A vehicle location system as defined in claim 1 wherein said means (a) modulates said energy so that said code is continually repeated.

4. A vehicle location system as defined in claim 1 including additional means for modulating said traffic-light-emitted energy according to a code which identifies the direction in which its respective traffic light is facing.

5. A vehicle location system as defined in claim 1 wherein said means (a) including means for modulating the flow of electric power to each of the modulated traffic lights so as to modulate the energy emitted by said lights.

6. A vehicle location system as defined in claim 1 wherein said means (a) includes a switch for controlling the flow of electric power to each of the modulated traffic lights, and means including a memory for controlling the operation of said switch in accordance with a binary code identifying the location of that traffic light.

7. A vehicle location system as defined in claim 6 wherein said memory operates in synchronism with the A.C. power supplying the traffic light so that the bits of said binary code are generated in synchronism with the frequency of the power supply, and said switch is operated to cut power to the traffic light in accordance with a pattern synchronized with the frequency of the power supplying the traffic light.

8. A vehicle location system as defined in claim 1 wherein said means (a) includes rectifier means for converting the A.C. power supplying the traffic light to D.C., and means for modulating the flow of D.C. power to the traffic light.

9. A vehicle location system as defined in claim 1 wherein the modulated energy emitted by the traffic lights is visible light, and said means (b) includes a light-sensitive device for sensing the light.

10. A vehicle location system as defined in claim 1 wherein said means (b) includes means for converting the modulated energy emitted by a traffic light into an electrical signal carrying the modulating code, storage means for receiving said electrical signal and storing said code and upon request producing an electrical signal carrying said code, and transmitter means for receiving said electrical signal from said storage means and transmitting a signal carrying said code.

11. A vehicle location system as defined in claim 10 wherein said transmitter means is a radio transmitter.

12. A vehicle location system as defined in claim 10 including clock means for automatically initiating, at predetermined intervals, transmission of a signal by said transmitter means carrying the code stored in said storage means at each of said intervals.

13. A vehicle location system as defined in claim 12 in which a plurality of vehicles move about the prescribed area, each of said vehicles carrying said means (b), and wherein said clocks of the vehicles are adjusted so that the transmitter means of each vehicle transmits its coded signal at time different from the time during which said transmitter means of any other vehicle transmits its coded signal.

14. A vehicle location system as defined in claim 10 including means responsive to a polling signal from said remote location for initiating transmission of a signal by said transmitter means carrying the code stored in said storage means at the time said polling signal is received.

15. A vehicle location system as defined in claim 1 wherein said means (b) includes means for incorporating in said transmitted signal additional coded information other than the modulating code.

16. A vehicle location system as defined in claim 15 in which a plurality of vehicles move about the prescribed area, and wherein said additional coded information identifies the vehicle from which said signal is transmitted, said additional code being different for each vehicle.

17. A vehicle location system as defined in claim 1 wherein said means (c) includes receiver means for producing an electrical signal carrying the code incorporated in the signal received from said means (b), storage means for receiving said electrical signal and storing said code and producing an electrical signal carrying said code, and display means for receiving said electrical signal from said storage means and visually displaying information corresponding to said code.

18. A vehicle location system as defined in claim 17 wherein the electrical signal from said receiver means carries said code in signal portions differing from each other in some characteristic, and including filter means between said receiver means and said storage means for separating said differing signal portions and separately presenting them to said storage means.

19. A vehicle location system as defined in claim 17 wherein said receiver means is a radio receiver, and including filter means for separating voice information received by said receiver from the radio signal portion carrying said modulating code.

20. A vehicle location system for identifying the location of a vehicle moving about a prescribed area in which light sources are present, the light sources having a primary function apart from that of vehicle location, said system comprising:
   a. means associated with individual light sources for modulating the visible light emitted by said sources, the light emitted by each source being modulated according to a predetermined code different from the modulating code of every other modulated light source, each said code identifying the location of its respective light source,
   b. means carried by the vehicle for individually sensing the modulated light emitted by each light source and in response thereto transmitting a signal incorporating a code corresponding to the code carried by the sensed modulated light, and
   c. means at a location remote from the vehicle for receiving said signal and in response thereto displaying unique location information corresponding to the code incorporated in said received signal.

21. A vehicle location system as defined in claim 20 wherein said modulation is undetectable by the human eye.

22. A method of locating a vehicle moving about a prescribed area in which traffic lights are present, comprising:
   a. modulating energy emitted by individual traffic lights, the energy emitted by each light being modulated according to a predetermined code different from the modulating code of every other modulated traffic light, each said code identifying the location of its respective traffic light,
   b. individually sensing at the vehicle the modulated energy emitted by each traffic light and in response thereto transmitting a signal incorporating a code corresponding to the code carried by the sensed modulated energy, and
   c. receiving said signal at a location remote from the vehicle and in response thereto displaying unique location information corresponding to the code incorporated in said received signal.

* * * * *